US010453200B2

(12) United States Patent
Mukherjee et al.

(10) Patent No.: US 10,453,200 B2
(45) Date of Patent: Oct. 22, 2019

(54) AUTOMATED SEGMENTATION USING DEEP LEARNED PRIORS

(71) Applicant: GENERAL ELECTRIC COMPANY, Schenectady, NY (US)

(72) Inventors: Suvadip Mukherjee, Bangalore (IN); Roshni Bhagalia, Niskayuna, NY (US); Xiaojie Huang, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 122 days.

(21) Appl. No.: 15/367,275

(22) Filed: Dec. 2, 2016

(65) Prior Publication Data

US 2018/0122082 A1  May 3, 2018

Related U.S. Application Data

(60) Provisional application No. 62/416,228, filed on Nov. 2, 2016.

(51) Int. Cl.
*G06T 7/143* (2017.01)
*G06N 3/08* (2006.01)
(Continued)

(52) U.S. Cl.
CPC .............. *G06T 7/143* (2017.01); *G06N 3/04* (2013.01); *G06N 3/0454* (2013.01);
(Continued)

(58) Field of Classification Search
CPC ........... G06T 7/143; G06T 7/136; G06T 7/12; G06T 7/11; G06T 7/162; G06T 7/194;
(Continued)

(56) References Cited

U.S. PATENT DOCUMENTS

| 5,489,782 A * | 2/1996 | Wernikoff ............ G01N 23/083 |
| | | 250/363.02 |
| 2003/0036751 A1* | 2/2003 | Anderson ............ A61B 5/0059 |
| | | 606/9 |

(Continued)

FOREIGN PATENT DOCUMENTS

| CN | 105513014 A | 4/2016 |
| CN | 105574859 A | 5/2016 |
| WO | 2016066042 A1 | 5/2016 |

OTHER PUBLICATIONS

Mahapatra, Dwarikanath, and Joachim M. Buhmann. "Prostate MRI segmentation using learned semantic knowledge and graph cuts." IEEE Transactions on Biomedical Engineering 61.3, 2014: 756-764. (Year: 2014).*

(Continued)

*Primary Examiner* — Bobbak Safaipour

(74) *Attorney, Agent, or Firm* — Fletcher Yoder, P.C.

(57) ABSTRACT

Embodiments described herein provide a hybrid technique which incorporates learned pulmonary nodule features in a model based energy minimization segmentation using graph cuts. Features are extracted from training samples using a convolutional neural network, and the segmentation cost function is augmented via the deep learned energy. The system and method improves segmentation performance and more robust initialization.

10 Claims, 3 Drawing Sheets

(51) Int. Cl.
G06N 3/04 (2006.01)
G06N 7/00 (2006.01)
G06T 7/194 (2017.01)
G06T 5/00 (2006.01)
G06T 7/11 (2017.01)
G06T 7/12 (2017.01)
G06T 7/162 (2017.01)
G06T 7/136 (2017.01)

(52) U.S. Cl.
CPC ............. *G06N 3/0472* (2013.01); *G06N 3/08* (2013.01); *G06N 7/005* (2013.01); *G06T 5/002* (2013.01); *G06T 7/11* (2017.01); *G06T 7/12* (2017.01); *G06T 7/136* (2017.01); *G06T 7/162* (2017.01); *G06T 7/194* (2017.01); *G06T 2207/10072* (2013.01); *G06T 2207/10081* (2013.01); *G06T 2207/10136* (2013.01); *G06T 2207/20076* (2013.01); *G06T 2207/20081* (2013.01); *G06T 2207/20084* (2013.01); *G06T 2207/20161* (2013.01); *G06T 2207/30064* (2013.01); *G06T 2207/30096* (2013.01); *G06T 2207/30101* (2013.01)

(58) Field of Classification Search
CPC ........... G06T 5/002; G06T 2207/20161; G06T 2207/10136; G06T 2207/10072; G06T 2207/30096; G06T 2207/20076; G06T 2207/20084; G06T 2207/30064; G06T 2207/10081; G06N 3/0472; G06N 3/0454; G06N 3/04; G06N 3/08; G06N 7/005

See application file for complete search history.

(56) References Cited

U.S. PATENT DOCUMENTS

| | | | | |
|---|---|---|---|---|
| 2008/0107352 | A1* | 5/2008 | Chang | G06K 9/40 382/263 |
| 2008/0292194 | A1* | 11/2008 | Schmidt | G06T 7/0012 382/217 |
| 2011/0243410 | A1* | 10/2011 | Wong | A61B 3/12 382/128 |
| 2012/0269424 | A1* | 10/2012 | Ebata | G06T 7/50 382/154 |
| 2015/0110381 | A1 | 4/2015 | Parvin et al. | |
| 2015/0110392 | A1* | 4/2015 | Wang | G06T 7/194 382/164 |
| 2015/0112182 | A1* | 4/2015 | Sharma | A61B 5/0261 600/408 |
| 2015/0199840 | A1* | 7/2015 | Hatanaka | A61B 6/032 345/424 |
| 2016/0044245 | A1 | 2/2016 | Tsubaki | |
| 2017/0293825 | A1* | 10/2017 | Shao | G06T 5/50 |
| 2018/0096490 | A1* | 4/2018 | Juvonen | G06T 7/60 |
| 2018/0197317 | A1* | 7/2018 | Cheng | G06T 11/008 |

OTHER PUBLICATIONS

Lu, Fang, et al. "Automatic 3D liver location and segmentation via convolutional neural network and graph cut." International journal of computer assisted radiology and surgery 12.2, 2017: 171-182. (Year: 2017).*

Linguraru, Marius George, et al. "Multi-organ segmentation from multi-phase abdominal CT via 4D graphs using enhancement, shape and location optimization." International Conference on Medical Image Computing and Computer-Assisted Intervention. Springer, Berlin, Heidelberg, 2010. (Year: 2010).*

Xu et., "Automated Lung Nodule Segmentation Using Dynamic Programming and EM-based Classification", Medical Imaging, May 15, 2002.

Fetita et al., "3D Automated Lung Nodule Segmentation in HRCT", Medical Image Computing and Computer-Assisted Intervention, vol. 2878, pp. 626-634, 2003.

Keshani et al., "Lung Nodule Segmentation and Recognition using SVM Classifier and Active contour modeling: A Complete Intelligent System", Computers in Biology and Medicine, vol. 43, Issue 4, pp. 287-300, May 1, 2013.

Zhang et al., "Discriminative Feature Learning for Video Semantic Segmentation", International Conference on Virtual Reality and Visualization (ICVRV), pp. 321-326, Aug. 30-31, 2014.

Song et al., "Accurate Segmentation of Cervical Cytoplasm and Nuclei Based on Multiscale Convolutional Network and Graph Partitioning", IEEE Transactions on Biomedical Engineering, vol. 62, Issue 10, pp. 2421-2433, Oct. 2015.

Ma et al., "Spectral—Spatial Classification of Hyperspectral Image Based on Deep Auto-Encoder", IEEE Journal of Selected Topics in Applied Earth Observations and Remote Sensing, vol. 9, Issue 9, pp. 4073-4085, Sep. 2016.

Dhungel et al., "Deep Learning and Structured Prediction for the Segmentation of Mass in Mammograms", ACVT, School of Computer Science, The University of Adelaide, http://cs.adelaide.edu.au/~carneiro/publications/neeraj_miccai.pdf.

"Lungs Tumours and Nodules Segmentation", http://www.rsipvision.com/lung-nodules-segmentation/, RSIP Vision.

* cited by examiner

AUTOMATED SEGMENTATION USING DEEP LEARNED PRIORS

CROSS REFERENCE TO RELATED APPLICATIONS

This application is a non-provisional of U.S. Provisional Patent Application No. 62/416,228 entitled "Automated Segmentation Using Deep Learned Priors", filed Nov. 2, 2016, which is incorporated herein.

FIELD

The subject matter disclosed herein relates to an automated segmentation, particularly as it relates to image analytics modalities for characterizing objects in a medical image.

BACKGROUND

Lung cancer is responsible for a significant percentage of all cancer related deaths, and is generally associated with grim prognosis unless diagnosed early. Early detection of pulmonary nodules via screening procedure is essential to enable clinicians determine the patient's treatment roadmap. Low dose computed tomography (LDCT) scan is the defacto standard for lung cancer screening, and lacks an automated lung nodule characterization framework to encompass the potential of three dimensional LDCT imaging for lung cancer screening.

A fully automated lung cancer screening procedure relies on three distinct steps. First, an automated lung nodule detection framework identifies the location of a nodule. This is an active area of research which has received significant attention in the recent years. Second, an automatic lung nodule segmentation procedure identifies the nodule boundary. Finally, the segmented nodule is analyzed via machine learning based methods to characterize the nodule as a benign, or a potentially malignant case. Solutions are lacking, however, as to issues in extracting features for characterization.

Automated nodule segmentation from three-dimensional (3D) chest computed tomography (CT) is in general a difficult problem since the appearance and morphology of a nodule could vary considerably depending on its type (e.g., solid or semi-solid) or based on the stage of the disease. Moreover, noise, reconstruction artefact, and presence of other pulmonary structures such as vessels, fissures, among others, complicate the segmentation problem. It is desired to address these issues to handle noise and imaging artifacts, and should demonstrate ability to suppress the non-nodule structures during segmentation. In addition, the following disclosure will beneficially address learned pulmonary nodule features in a model based, energy minimization segmentation problem. The details are as follows.

SUMMARY

The above and other drawbacks or deficiencies may be overcome or alleviated by development of a system as described as follows.

Embodiments herein disclose an automated lung nodule characterization framework that speeds of clinical workflow, reduces operator variability, and harnesses the potential of 3D LDCT imaging for lung cancer screening. Aspects of the invention also present a solution to lung nodule segmentation problems. Once an initial nodule is detected, improved methods are performed to accurately segment the detected nodule, which can then be directly used to extract features, as specified by a user, for characterization.

In addition, embodiments provide a robust segmentation algorithm that is adept at handling noise and imaging artifacts, and demonstrates ability to suppress the non-nodule structures during segmentation. While existing hybrid techniques may use deep learning, the deep learned information is used either as a pre-processing tool (for model initialization), or for post-processing the algorithm output (for refinement). In contrast, the hybrid technique revealed herein incorporates learned pulmonary nodule features in a model based, energy minimization segmentation problem which is solved using graph cuts. Features are extracted from training samples using a convolutional deep neural network (CNN), and the segmentation cost function is augmented via the deep learned energy. The proposed algorithm, referred to herein as the "Deep Learned Graph Cut" (DLGC) improves segmentation performance, and is more robust to initialization.

A non-transitory computer readable medium herein described comprises computer-readable instructions stored therein for causing a control processor to perform operations to determine the graph cut energy function. In one embodiment, the non-transitory computer readable medium described comprises computer-readable instructions stored therein for causing a control processor to perform operations to determine a graph cut energy function comprising the steps of: determining a data term which is a radial gradient of an image; using a deep learned probability map to segment the image to create a segmented image; and creating a graph by connecting positive voxels to a sink node, and connecting negative voxels to a source node; wherein the graph energy function utilizes a threshold surface in the segmented image, reducing error at the edges of the probability map, and providing enhancement of an object in the image. The graph energy function adds domain specific, image derived low level features (e.g. radial edge map), in addition to a regularizing term to provide a smooth solution.

Regarding the term "signed radial gradient" of an image, the sign (positive/negative) is reflected in the graph cut as the graph cut utilizes both magnitude and sign. In contrast, traditionally, the absolute value of the gradient is taken for computing the edge map.

Variations can thus be designed to accommodate different size, shapes, groups, and structures such that the methods can be accomplished in a cost-effective efficient manner. The structural system and architecture can be modified and components interchanged to achieve functionality and improvements as depicted in the detailed description and drawings.

DETAILED DESCRIPTION

Figure 1:
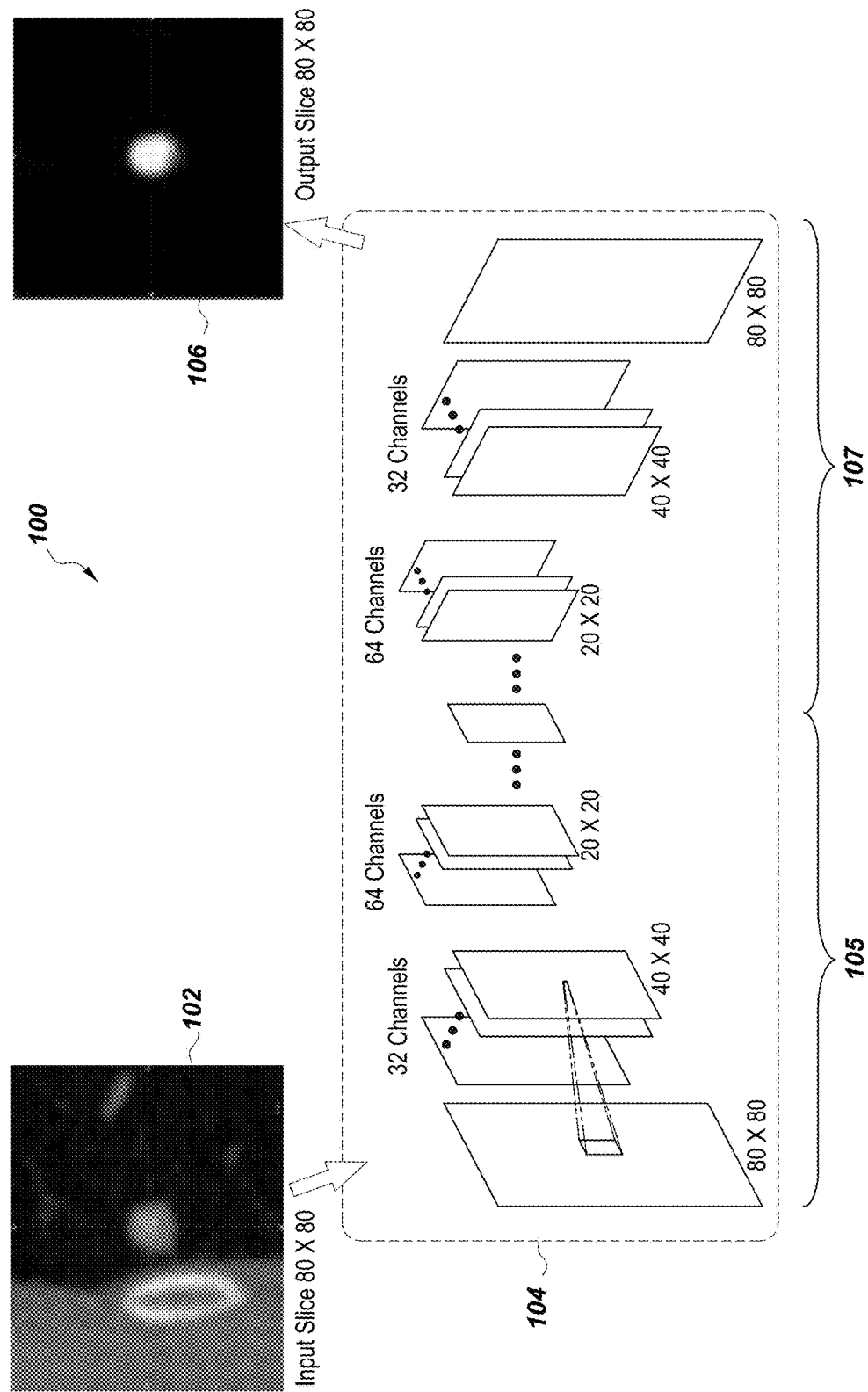
FIG. 1 depicts a perspective view of an embodiment of the invention.

Various embodiments will be described more fully hereinafter with reference to the accompanying drawings. Such embodiments should not be construed as limiting. For example, one or more aspects can be utilized in other embodiments and even other types of devices. Referring to the drawings in general, it will be understood that the illustrations are for the purpose of describing particular embodiments and are not intended to be limiting.

A hybrid methodology using deep learning is disclosed to solve image analysis problems; the methodology posed in a cost function minimization framework. The hybrid cost function comprises at least three components including: (a) an image based data term which utilizes low level image features (such as edges, texture, region statistics etc.), (b) a regularizing energy term to impart smoothness to the solution and (c) a data driven prior knowledge about the object via deep learned object probability map. The salient highlights of the approach are as follows:

Unlike traditional machine learning based techniques, the robustness and consistency of convolutional deep learning architectures is leveraged. This provides improved stability and enhanced performance compared to other machine learning based regression frameworks such as logistic regression, support vector regressor, among others. In addition, the framework embeds the deep learned information into a single objective function, and presents a one shot, efficacious procedure for obtaining a solution without imposing a hard constraint based on the prediction of the deep learning model.

The hybrid methodology is a solution that goes beyond working directly with the deep learning prediction for estimating the output, and advantageously provides the robustness by incorporating (a) a domain specific (local), image derived term and (b) a regularizer which restricts irregularities in the solution. In one embodiment, the hybrid methodology is applicable to both 2D and 3D image analysis problems. Aspects of the methodology are modality agnostic, and can be applicable to a wide range of problems from different modalities, including, for exemplary purposes only and not limitation, CT, magnetic resonance imaging (MRI), and ultrasound.

Embodiments of the disclosed methodology can also be extended to a large number of image analysis problems that are posed in a cost function minimization framework. This includes, but is not restricted to image analysis tasks such as segmentation, enhancement, de-noising, and background estimation.

Mathematical Formulation

In one embodiment, an image analysis problem (such as segmentation) is formulated as a cost function minimization problem. While the nature and appearance of the function depends on the specific application, the energy function to be minimized can be broadly expressed as follows:

$$E(x)=E_{img}(x)=E_{DL}(x)+E_{reg}(x) \quad (1)$$

The total energy E(x) comprises three terms: an image derived energy $E_{img}(x)$, the deep learning based cost function $E_{DL}(x)$, which imparts a learned prior to the solution, and finally, a regularizing term $E_{reg}(x)$ which encourages a smooth solution. Such formulations are common in several image analysis problems such as segmentation, image enhancement, etc. We shall provide examples of two such cases for illustration.

Image Segmentation Examples

Image segmentation refers to the problem of grouping the pixels or voxels of an image into foreground and background classes. Energy minimization based strategies for segmentation are popularly used to develop an optimization equation to identify the best partitioning of the image domain. Such a problem can be solved either using continuous or discrete optimization; three different cases are demonstrated here where segmentation may be performed using the deep learned prior. One representation of the deep learned prior is as follows:

$$E_{DL}(x) = -\ln\left(\frac{P(x)}{1-(P(x))}\right) \quad (2)$$

Here, P(x) is a probability map predicted by the deep learning algorithm, which provides evidence of the presence or absence of the desired object. The original image is defined as f(x).

Object Segmentation Via Level Sets $$E(\phi(x))=\int(E_{img}(x)+\lambda E_{DL}(x))H(\phi)dx+\mu\int|\nabla H(\phi)|dx \quad (3)$$

The $\phi$ is the level set function. The image based energy term $E_{img}(x)$ is derived using low level image features (edge, texture, etc.), and the curve regularization is provided by the regularizing term $|\nabla H(\phi)|$. The deep learning based term $E_{DL}(x)$ specifies the direction of curve propagation based on the segmentation prediction of the deep learning model. The functional (3) is solved using calculus of variation.

Object Segmentation Via Variational Thresholding

In a variational segmentation problem, the objective is to find a threshold surface t(x) such that the segmented output s(x)={x: f(x)>t(x)}. The corresponding energy function can be expressed as follows:

$$E(t(x))=\int|\nabla P(x)||(f(x)-t(x))^2 dx+\mu\int|\nabla t(x)|^2 dx \quad (4)$$

The solution to (4) finds the optimal threshold surface t*(x) which is smooth, and minimizes the error at the edges of the probability map function.

Object Segmentation Using Graph Cut

The segmentation problem is solved using embodiments herein that implement discrete optimization using graph cut. The graph cut energy function is written as follows:

$$E(x) = \Sigma \nabla_r^T g(x) * f(x) - \mu \Sigma \ln\left(\frac{P(x)}{1-(P(x))}\right) + E_{reg}(x) \quad (5)$$

The first term is the data term, which signifies the radial gradient of the image. The second term uses the deep learned probability map to add robustness to the segmentation. The symbol '*' denotes the convolution operator. The graph can be created by connecting the positive voxels to the sink node (T) and the source node to the negative voxels. The solution is obtained by using the min-cut algorithm.

Object Enhancement Example

Object enhancement refers to the problem of suppressing background structures to identify the foreground object. One enhancement algorithm, as similar to equations (6a & 6b): The optimal surface t*(x) is a smooth surface which enhances the objects, and suppresses the background. This technique serves as an enhancement methodology for structures which are thin (such as filamentous objects like blood vessels etc.) and elongated.

Foreground-Background Estimation

In one embodiment, the foreground and background images are denoted by functions s(x) and b(x). The cost function for estimating a smooth foreground and background function can be expressed as one of the following:

$$s^*(x)=\mathrm{argmin}_{s(x)}\int|f(x)-P(x)s(x)|^2 dx+\mu\int|\nabla s|dx \quad (6a)$$

$$b^*(x)=\mathrm{argmin}_{b(x)}\int|f(x)-(1-P(x))b(x)|^2 dx+\mu\int|\nabla b|dx \quad (6b)$$

Foreground/background estimation may be useful for several processing and analysis tasks such as bias field removal, analysis of region statistics.

In the above-mentioned embodiments of the method, the explicit mechanism provides combined data smoothing and local image information with the deep learned prediction. This leads to a more robust solution than any of the methods used in isolation.

Deep Learned Graph Cut

In disclosed embodiments, a segmentation problem is equivalent to a voxel partitioning technique, where the image domain $\Omega \in \mathbb{R}^3$ is partitioned into non-overlapping foreground and background regions $\Omega_f$ and $\Omega_b$, respectively. In an optimization framework, the objective is to compute this optimal partition, such that the object is accurately delineated from the background.

Segmentation Cost Function

If f(x) is the three-dimensional CT lung nodule region-of-interest (ROI) voxels, and $x \in \Omega$ is a voxel in the image domain, the segmented object is obtained as the set of voxels which would minimize the following cost function:

$$\Omega_f = \underset{\omega \subset \Omega}{\operatorname{argmin}} \sum_x \underbrace{E_{edge}(x) + E_{DL}(x)}_{\text{Data term}} + \underbrace{E_{reg}(x)}_{\text{Regularizer term}} \quad (7)$$

The data term in (7) defines the segmentation criteria, while the smoothness term prevents irregularities of the segmented object. The data term comprises two terms: an image derived component, and a machine-learned data derived region model, which serves as a soft segmentation prior. The regularization term in (7) prevents irregularities of the segmented object.

Edge Energy Function

The edge energy function is derived based on the signed directional gradient of the image. Mathematically, we define the edge cost function as follows:

$$E_{edge}(x) = \nabla_r g_\sigma(x) * f(x) \quad (8)$$

Here, $\nabla_r f$ denotes the (signed) directional derivative along the unit vector r, and is given by $\nabla_r f = \langle \nabla(f * g_\sigma), r \rangle$ This direction is chosen as the radially outward direction, computed with respect to an initially detected voxel $x_0$. The image f(x) is smoothed by the isotropic Gaussian function $g_\sigma(x)$. Since the lung nodules are brighter than the background, the signed derivative is negative for boundary voxels. Therefore, the minimizer of Equation (8) preferentially selects the boundary voxels in the segmented volume.

Deep Learned Segmentation Prior

A segmentation model using a solely edge based criteria is vulnerable to weak edges, resulting in over-segmentation (i.e., contour leakage). This is arrested by adding an object region prior in the segmentation cost function, which augments the segmentation. Instead of using a few region priors that have previously used a model based techniques or learning based methods, deep neural networks optimized here in developing the region prior.

Deep neural networks have shown promise in recent problems in traditional computer vision and image analysis, especially when the problem involves learning a hypothesis function $h_\Theta$ which estimates the output $\hat{x}$ from a set of training data $\{x_i\}$ and associated supervised labels $\{y_i\}$ as $\hat{x} = h_\Theta(x_i)$. Here $\Theta$ is a set of hyper-parameters which the algorithm estimates from the training sample by minimizing an appropriate loss function. The fully convolutional encoder-decoder deep neural architecture proposed estimates a regression function which maps each pixel of a two-dimensional input image to a corresponding segmentation probability map P: $\mathbb{R}^2 \mapsto (0,1)$. Assuming the availability of enough training data, such deep neural architectures have demonstrated success in object localization. The deep neural network is trained on a set of 15,231 two-dimensional axial slices for solid lung nodules and 9,675 axial slice for part solid nodules.

The architecture defined here comprises four decoder layers with down-sampling, and four encoder layers with deconvolution (as shown in FIG. 1). The corresponding segmentation masks were annotated by trained radiologists. To obtain the probability score for a 3D volume, each axial slice of a test volume is regressed using the learned model, and the two-dimensional output is reconstructed to obtain a 3D foreground probability term. Using this information, the deep learned region cost is defined as follows:

$$E_{DL}(x) = -\lambda \ln\left(\frac{P(x)}{1 - P(x)}\right) \quad (9)$$

Using this description for the segmentation cost function, an optimization of the cost function is performed using a graph-cut.

Graph Creation and Segmentation

Figure 2:
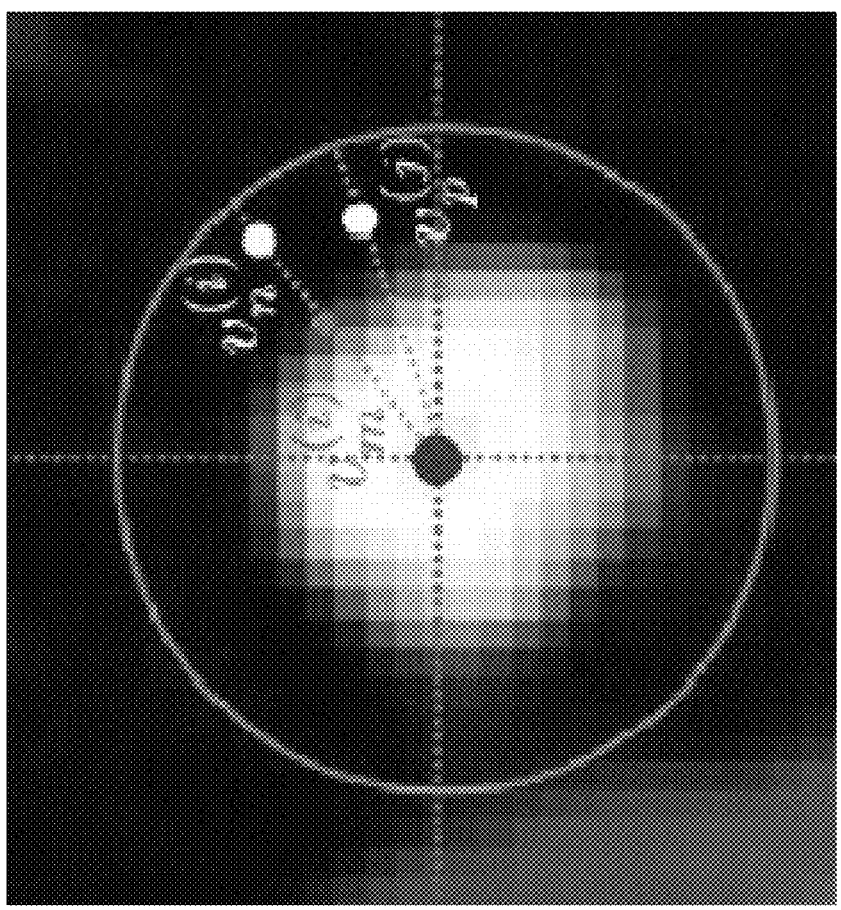
FIG. 2 depicts a perspective view in one aspect of the invention.

Implementation of the graph cut algorithm builds on the idea of polar graphs; a spherical sub volume $\Omega_s = \{x: \|x - x_0\| < R\}$, centered at $x_0$ is extracted from a three-dimensional image domain. A mapping is defined from the image domain to the graph G=(V, E, W), where V and E represent the sets of vertices and edges of the graph, and W denotes the set of associated edge weight. The spherical domain is subdivided into N uniformly sampled radial lines $R(i) = \{(1-t)x + tr_i\}$, where $t \in [0,1]$, $i=0, \ldots, N-1$, and $\|r_i - x_0\| = R$. The parameter t is uniformly sampled to produce M vertices per radial column. Additionally, two special vertices S and T known as the source and sink, are used by the graph-cut algorithm to classify the voxels into foreground and background, respectively. FIG. 2 shows the two-dimensional equivalent of the graph creation procedure.

Model Initialization and Min-Cut Segmentation

Embodiments demonstrate an initial detected voxel $x_0$ to commence the segmentation. With the initialization already available either from an automated algorithm or from an expert user, the algorithm specifies a maximum radii R to define the polar graph. This approximate radii is estimated from the segmented result of the deep learning output. If $B = \{b_j\}$ denotes the set of boundary voxels obtained by taking the zero level set of (3), the radii is estimated as follows:

$$R = \frac{1.5}{|B|} \sum |b_j - x_0|^2 \quad (10)$$

The cost function in Equation (8) can be segmented using the min-flow strategy by judiciously assigning weights to the graph edges. It is desired that the minimum cost cut of the graph creates a partition such that the foreground vertices are clustered with the node S, and the background vertices are attached to T. The edge weights of the voxels to the S-T nodes are set up using the following strategy. If x denotes the voxel position corresponding to any node $v \in V$, the total node cost is given by:

$$E(x) = E_{edge}(x) + E_{DL}(x) \quad (11)$$

Ideally, for nodule voxels, E(x) is negative, and positive for background voxels. Therefore, the weights are set up as follows:

$$w(S,v)=|E(x)|H(-E(x)) \qquad (12)$$

$$w(T,v)=|E(x)|H(E(x)) \qquad (13)$$

Here, H(z) is the Heavy-side step function. The objective function is minimized via the max-flow algorithm which runs in polynomial time.

Experimental Results: Segmentation of Lung Nodules from Low Dose CT

Performance of the system and method has been evaluated on datasets of solid and semi-solid pulmonary nodules. Two separate experiments were performed for each category, one where the initial voxel $x_0$ is assumed to be at the nodule center, and a second scenario where the initial position was slightly shifted from the nodule centroid. The performance of the deep learned graph cut (DLGC) was tested against traditional edge based graph cut, and the segmentation method of U-net. The experimental results are reported in the following tables, Table 1 and Table 2, where the Dice scores for the different algorithms are reported. From the experimental results, it is observed that Deep Learned Graph Cut (DLGC) provides stable performance, and is more robust to initialization.

The performance comparison of solid pulmonary nodules in shown in Table 1.

TABLE 1

|  | Centered | | | Random | | |
| --- | --- | --- | --- | --- | --- | --- |
|  | DL-GC | GC | U-net | DL-GC | GC | U-net |
| Mean | 0.68 | 0.68 | 0.57 | 0.66 | 0.62 | 0.57 |
| Std. | 0.14 | 0.15 | 0.24 | 0.17 | 0.24 | 0.24 |
| Median | 0.71 | 0.72 | 0.61 | 0.70 | 0.69 | 0.61 |

The performance comparison of solid pulmonary nodules in shown in Table 2.

TABLE 2

|  | Centered | | | Random | | |
| --- | --- | --- | --- | --- | --- | --- |
|  | DL-GC | GC | U-net | DL-GC | GC | U-net |
| Mean | 0.65 | 0.62 | 0.55 | 0.64 | 0.57 | 0.55 |
| Std. | 0.13 | 0.17 | 0.24 | 0.15 | 0.22 | 0.17 |
| Median | 0.70 | 0.69 | 0.60 | 0.68 | 0.65 | 0.60 |

Embodiments disclosed herein describe the deep learning architecture and system, as described in FIG. 1. The graphical illustration shows the system 100 includes an input image slice 102 from a CT scan, which is processed through a neural network 104 by a computer processor to generate an output image slice 106. Within the neural network are four down-sampling layers 105 and four up-sampling layers 107. The deep neural network is trained on a set of 15,231 two dimensional axial slices 102 for solid lung nodules and 9,675 axial slices for part-solid nodules. The architectural system 100 comprises four decoder layers with down-sampling and four encoder layers with deconvolution. The corresponding segmentation masks were annotated by trained radiologists.

FIG. 2 references a graph construction on a 2D axial slice. The original graph which is constructed from 3D volume shares the same methodology.

Figure 3:
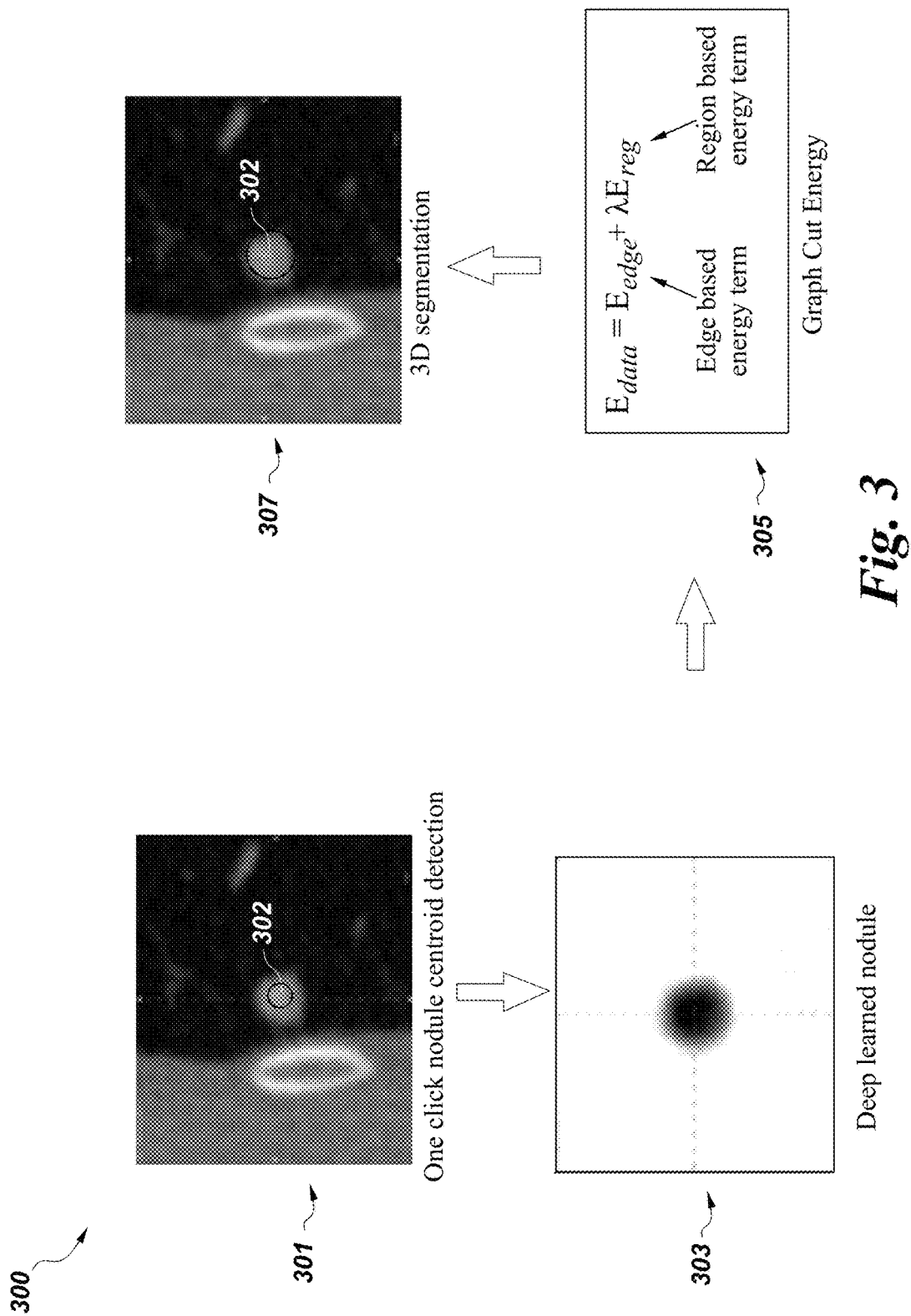
FIG. 3 illustrates a schematic representation of one embodiment.

An embodiment in FIG. 3 illustrates a hybrid system 300 including a semi-automated procedure (i.e., one user-click) for segmenting lung nodules from CT volumes. A one-click nodule centroid 302 is detected at a detection step 301 which then proceeds through the deep-learning module 303 and then the graph-cut energy technique 305 which clarifies the edges and smooth surface of an object, here, the nodule centroid 302. The resulting 3D segmentation 307 thus represents the accuracy of the data driven deep-learning approach for nodule segmentation in the system 300. This accurate segmentation provides automated characterization of the nodule. The hybrid method, using a model based technique (graph-cut) and a data driven approach (deep learning is proposed) for nodule segmentation can work with any modality in imaging, medical imaging or otherwise.

Various embodiments of the invention may encompass any number of designs, configurations, conceptual, logical, and/or hardware-based architecture. While individual embodiments have been thus described, the individual embodiments may be integrated and combined for use with the system. Configurations can be simplified and complexity minimized to reduce cost and provide easier implementation.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed and described above.

The computer-readable medium may be a non-transitory computer-readable media including forms and types of memory, and also may include computer-readable media except for a transitory, propagating signal. In one implementation, the non-volatile memory or computer-readable medium may be external memory.

Although specific hardware and methods have been described herein, any number of other configurations may be provided in accordance with embodiments of the invention. Thus, while fundamental novel features of the invention have been shown, described, and referenced, it will be understood that various omissions, substitutions, and changes in the form and details of the illustrated embodiments, and in operation thereof, may be made by those skilled in the art without departing from the spirit and scope of the invention. Substitutions of elements from one embodiment to another are also fully intended and contemplated. The invention is defined with regard to the claims appended hereto, and equivalents of the recitations therein.

While the invention has been described in considerable detail with reference to a few exemplary embodiments only, it will be appreciated that it is not intended to limit the invention to these embodiments only, since various modifications, omissions, additions and substitutions may be made to the disclosed embodiments without materially departing from the scope of the invention. In addition, many modifications may be made to adapt to a particular situation or an installation, without departing from the essential scope of the invention. Thus, it must be understood that the above invention has been described by way of illustration and not limitation. Accordingly, it is intended to cover all modifications, omissions, additions, substitutions or the like, which may be comprised within the scope and the spirit of the invention as defined by the claims.

The invention claimed is:

1. A system comprising a hybrid method to process image analytics posed in a cost function minimization framework, the system comprising:
   one or more image data sets comprising image-based data that utilizes low level image features; and
   a probability map that provides prior knowledge about an object;
   wherein the hybrid method comprises: providing at least one of the image-based data, providing a regularizing energy that imparts smoothness by reducing an error at the edges of the probability map, integrating the prior knowledge about the object via the probability map, and extracting features, as specified by an user, for characterization.

2. The system of claim 1, wherein the low level image features include one or more of edges, texture, and region statistics, alone or in combination.

3. The system of claim 1, wherein the hybrid method is used as a pre-processing tool by a processor for model initialization, or utilized as a post-processing tool by the processor for refining output data and output images.

4. The system of claim 1, wherein the hybrid method further comprises a step of predicting the cost function minimization framework.

5. The system of claim 4, wherein the cost function minimization framework is an optimization architecture that computes an optimal partition to provide visualization of the object delineated from the background.

6. The system of claim 1, wherein the image analytics comprise segmentation, enhancement, de-noising, and background estimation, individually or in combination.

7. The system of claim 1, wherein the one or more image data sets are provided by at least one modality, or a combination of modalities, wherein the modalities comprise: magnetic resonance (MR), computed tomography (CT), ultrasound, X-ray, or variations thereof.

8. The system of claim 1, wherein the hybrid method utilizes a smooth surface of the object to enhance the object in the image data set and suppress background of the image data set.

9. The system of claim 8, wherein the objects include anatomical structures.

10. The system of claim 9, wherein the anatomical structures comprise filamentous objects including blood vessels.

* * * * *